(12) United States Patent
Schroeder

(10) Patent No.: US 12,001,184 B2
(45) Date of Patent: Jun. 4, 2024

(54) CONTROL SYSTEM FOR AN AUTOMATION SYSTEM AND METHOD FOR OPERATING AN AUTOMATION SYSTEM

(71) Applicant: Robert Bosch GmbH, Stuttgart (DE)

(72) Inventor: Thomas Schroeder, Urspringen (DE)

(73) Assignee: Robert Bosch GmbH, Stuttgart (DE)

( * ) Notice: Subject to any disclaimer, the term of this patent is extended or adjusted under 35 U.S.C. 154(b) by 61 days.

(21) Appl. No.: 17/091,524

(22) Filed: Nov. 6, 2020

(65) Prior Publication Data
US 2021/0141357 A1    May 13, 2021

(30) Foreign Application Priority Data

Nov. 13, 2019   (DE) ...................... 10 2019 217 516.3

(51) Int. Cl.
*G05B 19/05*    (2006.01)
(52) U.S. Cl.
CPC ........ *G05B 19/05* (2013.01); *G05B 2219/163* (2013.01)
(58) Field of Classification Search
CPC .............. G05B 19/05; G05B 2219/163; G05B 19/042; G05B 19/4185; G05B 2219/32252
See application file for complete search history.

(56) References Cited

U.S. PATENT DOCUMENTS

| | | | | |
|---|---|---|---|---|
| 10,466,277 B1 * | 11/2019 | Brooks | .............. | G01R 19/0092 |
| 2005/0123408 A1 | 6/2005 | Koehl | | |
| 2012/0004786 A1 * | 1/2012 | Lo | ..................... | H02J 13/00028 |
| | | | | 700/296 |
| 2013/0123953 A1 * | 5/2013 | Reichard | .............. | G05B 19/408 |
| | | | | 700/83 |
| 2016/0186531 A1 * | 6/2016 | Harkless | ................. | E21B 33/13 |
| | | | | 702/6 |
| 2017/0001653 A1 * | 1/2017 | Ferencz, Jr. | ........... | G16Y 10/40 |
| 2017/0192407 A1 * | 7/2017 | Kurella | ................. | G06F 3/0482 |
| 2018/0238579 A1 * | 8/2018 | Bull | ....................... | G05B 15/02 |
| 2019/0341799 A1 | 11/2019 | Delince et al. | | |
| 2020/0028702 A1 * | 1/2020 | Sawyer | ................. | H04L 12/413 |

FOREIGN PATENT DOCUMENTS

DE    10 2016 200 631 A1    7/2017
DE    10 2019 106 729 A1    10/2019

OTHER PUBLICATIONS

German Patent Office Written Opinion corresponding to applicaton DE 10 2019 217 516.3, dated Aug. 5, 2020 (German language document (7 pages)).

* cited by examiner

*Primary Examiner* — Christopher E. Everett
*Assistant Examiner* — Tameem D Siddiquee
(74) *Attorney, Agent, or Firm* — Maginot, Moore & Beck LLP

(57) ABSTRACT

The disclosure relates to a control system for an automation system which is configured to control at least one automation component of the automation system, and which has a standardized data interface and is further configured to receive control instructions from outside via the standardized data interface, to convert the received control instructions into control commands for the at least one automation component and to control the at least one automation component using said control commands, and also a method for operating an automation system.

10 Claims, 1 Drawing Sheet

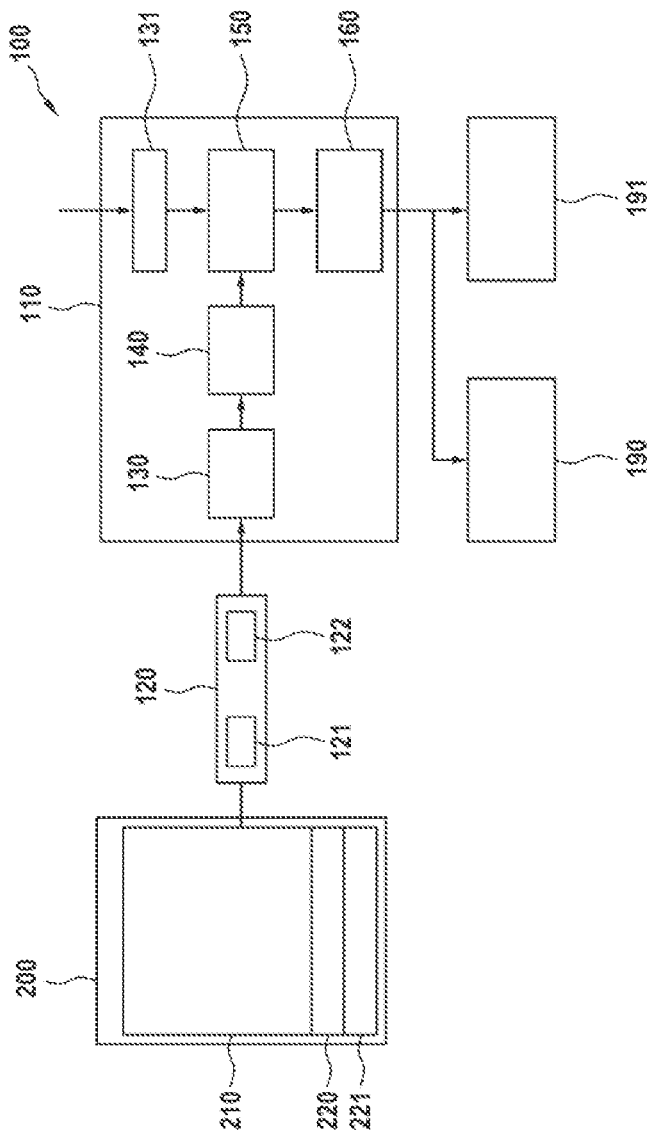

1

CONTROL SYSTEM FOR AN AUTOMATION SYSTEM AND METHOD FOR OPERATING AN AUTOMATION SYSTEM

This application claims priority under 35 U.S.C. § 119 to application no. DE 10 2019 217 516.3, filed on Nov. 13, 2019 in Germany, the disclosure of which is incorporated herein by reference in its entirety.

TECHNICAL FIELD

The present disclosure relates to a control system for an automation system which is configured to control at least one automation component of the automation system, and a method for operating an automation system having at least one automation component and a control system.

BACKGROUND

Automation systems can be used for different applications, particularly in industry. For this purpose, automation systems have one or—normally—a plurality of automation components which are controlled or operated via one or possibly more control systems. Automation components of this type may, for example, be robots, handling devices and the like. Many different processes can be automated in this way.

Programmable logic controllers (PLCs), for example, can be used to communicate control instructions or commands to a control system of this type, according to which the automation components concerned are then intended to be controlled. A PLC of this type can be combined with a relevant control system and provides, in particular, a human-machine interface (HMI).

Due to the, typically specific, coordination of a PLC of this type with a relevant automation system, no particular flexibility exists in terms of the options for providing control instructions or commands for control systems of this type.

SUMMARY

A control system for an automation system and a method for operating an automation system having the features of the disclosure are proposed. Advantageous designs form the subject-matter of the embodiments and the following description.

The disclosure relates to a control system for an automation system, as already explained in detail above. The control system is configured to control at least one automation component of the automation system—but typically and appropriately also a plurality of automation components. These automation components are, in particular, part of the automation system. A control of an automation component is to be understood here to mean, in particular, that corresponding commands and/or signals are provided by the control system and are then implemented by a corresponding drive system of the automation component. The movement of a robot arm, for example, is conceivable here. For this purpose, the control system also has, in particular, corresponding computing means or a processor, appropriately also corresponding interfaces to output said commands or signals.

The control system further has a standardized (or system-independent) data interface and is further configured to receive control instructions via this standardized data interface from outside, e.g. via a network or the Internet, and to control the at least one automation component using these control instructions. The latter therefore also means, in particular, converting the received control instructions into corresponding commands or signals which are then output in order to e.g. effect the movement of the robot arm. The control instructions in turn contain, in particular, commands by means of which the at least one automation component is intended to be controlled in a targeted manner. Commands of this type can have widely differing complexity, ranging, for example, from individual actions such as, for example, "activate output", via movement commands ("move interpolated while maintaining predefined dynamic limits to a target position") through to complex processes ("run script" or "move from A to D via B and C with rounding of the contour while maintaining the dynamic limits and given web parameters").

A standardized data interface is understood to mean, in particular, that control instructions can be received and, in particular, can also be processed in a standardized data format or protocol format. A particularly preferred standard is the REST protocol or REST format (or REST API, wherein API stands for "Application Programming Interface"), i.e. the control system appropriately has a data interface that is standardized in accordance with REST and is configured to receive control instructions in accordance with the REST protocol, in particular furthermore in accordance with URI, from outside via the data interface, and appropriately to convert them into internal commands to control the automation system.

The term or acronym REST stands for "Representational State Transfer" and designates a programming paradigm for distributed systems, in particular for Web services. REST is an abstraction of the structure and behavior of the 'World Wide Web'. The aim of REST is, in particular, to provide an architectural style which better represents the requirements of the modern Web. REST differs from other architectural styles above all in the requirement for a uniform interface. Unlike many related architectures, REST does not code any method information into the URI (URI stands for "Uniform Resource Identifier", and is an identifier consisting of a character sequence which serves to identify an abstract or physical resource), since the URI indicates the location and name of the resource, but not the functionality that the Web service offers for the resource.

The REST protocol essentially comprises different commands, wherein, for the present case, the POST command, in particular, is appropriate. This command inserts a new (sub-)resource below the indicated resource (in the present case relating to an automation component). Since the new resource does not yet have a URI, the URI addresses the higher-level resource. As a result, the new resource link is returned to the client. POST can also be used in the broader sense to map operations which are not covered by any other method.

In the context of the present disclosure, a command is to be understood to mean, in particular, a newly created resource, and a resource link is to be understood to mean a unique identification number with which the processing state of the command can be queried or monitored.

The particular advantage of REST is that, e.g. in the World Wide Web, a large part of the infrastructure required for REST (e.g. Web servers and application servers, HTTP-enabled clients, HTML and XML parsers, security mechanisms) is present, and many Web services per se are REST-compliant. A multiplicity of libraries further exist which very simply enable REST queries in many programming languages in order to create HMIs (Human-Machine Interfaces) or other superimposed control applications therewith.

It thus becomes possible to create control instructions—and therefore commands—for the control system independently from the hardware and operating system of the control system. It is appropriate, for example, that the control instructions are transmitted via a browser which is provided, in particular, on a computing system disposed remotely from the automation system, via the standardized data interface to the control system. In this way, a Human-Machine Interface (HMI) can therefore be provided in a particularly simple manner via pure WEB technologies (e.g. HTML5), in fact ultimately all over the world, as long as a corresponding data connection, e.g. via the Internet, is present. Both individual commands and complete command sequences can be predefined via the control instructions and can then be processed by the control system.

It is then particularly preferably possible to address any control system worldwide (as long as a corresponding data connection, e.g. via the Internet, is present) by means of IPv6 addresses (the IPv6 addresses are unique for each control system). It is thus possible (only by means of the request address) to address precisely one control system in the world and to send precisely one defined command (within the control instruction) to this precisely known object (in the sense of an automation component or possibly a part thereof). Only one Internet browser or library, for example, which can generate REST requests (i.e. the corresponding standardized control instructions) is required for this purpose. By means of the addressing, a user indicates the entity of the control system to which the command or control instruction is intended to be sent. The command that is intended to be executed is furthermore also preferably indicated in the address.

User data of a REST request of this type then contain the parameters of the command Via the REST definition (address and data are normally transmitted as an inseparable entity), it is ensured that the parameters are always consistent. If a plurality of REST requests are made in parallel, this means that a consistent pair comprising the address and user data is always present in the control. The control system then transmits back a response. If the command was valid and can be executed, this response contains an identification (a unique number) via which the processing of the command can be tracked/monitored. If the command was invalid, the response contains e.g. an error code which describes the error type (for example "invalid parameters" or "command not permitted in current control state").

A REST request or generally a control instruction is appropriately transmitted by means of HTTPS or a different secure and/or encrypted connection, so that both its integrity and confidentiality are ensured.

The user data can differ according to the command (within the control instruction). The target position is thus typically indicated in the case of movement commands, whereas other values are predefined, if necessary, in the case of management commands.

It is particularly appropriate if the control instructions contain commands which represent simple instructions or commands to the automation component, e.g. "move to position x,y,z". A particularly simple implementation of the transmission of control instructions via a standardized data interface is thus possible. Complex actions such as "grab the object on the conveyor belt" are slightly more difficult to implement, but are nevertheless representable.

As an example, a complex processing machine can contain e.g. a loading robot or "loader". In order to move this robot in a straight line from the current position to the position (X=10; Y=20; Z=30), a REST request is sent to the address "https://192.168.0.208:8069/rest/api/1.0/motion/kin/Loader/cmd/moveLinAbs/". Here, the IP address stands for the control, "kin" for "kinematic" (i.e. a robot at this control) "Loader" for the name of the robot to be controlled, "cmd" indicates that a command is intended to be executed, and "moveLinAbs" stands for the specific command.

The advantage of this addressing is that it is human-readable, is particularly simple to interpret and extendable in any way (with additional automation components or additional commands).

The parameters of the command are contained in the user data of the REST request. In this example, these could appear as follows:

```
{ "kinPos":["10.0","20.0","30.0"],
  "lim":{"vel":"500.0".
  "acc":"250.0",
  "dec":"250.0"
}
```

With the address and user data, the command for the control is completely described and can be executed. No additional data whatsoever are required.

The control system is preferably configured to receive control instructions via the standardized data interface, user data being contained in said control instructions in a standardized format, in particular as JSON. The term or acronym JSON stands for 'JavaScript Object Notation' which is a compact data format in an easily readable text form for the purpose of data exchange between applications. Every valid JSON document is intended to be a valid JavaScript and is intended to be able to be interpreted via eval( ) (this is a method in JavaScript). JSON is typically independent from the programming language.

This offers the advantages that the user data are therefore human-readable and flexibly extendable. The sequence of the parameters is irrelevant, and optional parameters and mandatory parameters and a wide variety of basic types (integer, float, string, enumeration, etc.) or complex substructures are also possible. The parameters which are allowed and/or necessary can be defined, e.g. by the control system manufacturer, for each command in a control instruction.

The control system is advantageously configured to output information relating to control instructions for the control system, in particular a structural schema of the control instructions and/or available control instructions, on request via the standardized data interface. A JSON schema which defines the structure of the parameters of a desired command or of different commands can thus be obtained or queried in the sense of a metadata query of the address (of the control system, from e.g. a browser).

It is also particularly preferable if the control system is configured to control the at least one automation component using the control instructions and depending on information contained therein relating to an access right in respect of the control system. In this way, for example by means of a rights management implemented in the control system, a manufacturer, for example, and/or an operator of the automation system can control the automation system or can specify that only authorized persons or groups can issue commands (within the control instructions). An authorization concept of this type can be predefined at individual command level. It is thus possible to specify precisely which user or which user group is permitted to execute which command.

The control system preferably has a buffer memory and is configured to store control instructions received via the standardized data interface in the buffer memory and to remove the control instructions, using which the at least one automation component is controlled, from the buffer memory, in particular in the sequence of their input (i.e. according to the FIFO (i.e. "First In First Out") principle. It is thus possible to define continuous sequences also (e.g. "move from A to D via B and C on a spline without stopping") via the actually non-real-time-capable data interface.

However, it can similarly be appropriate if the control system is configured to use a control instruction received via the standardized data interface immediately after reception to control the at least one automation component. A control instruction or command is then, in a manner of speaking, predefined unbuffered. In this case, the already active command is suppressed and the new command becomes active immediately.

Both the variant with a buffer memory and also the variant without the use of a buffer memory (which can of course nevertheless be present) can obviously be provided in parallel in the control system. Depending on the situation and/or depending on the control instruction (e.g. due to information contained therein), the one or the other variant can then be used.

Unlike conventional concepts for automation systems, with the proposed procedure nothing is configured and no data are queried in the control instructions or the commands contained therein (even though this is possible via the described interfaces). Specific machine movements can be predefined. The possible commands correspond, in particular, exactly to those which can also be predefined from a local PLC, a locally running script via internal interfaces. The architecture can be chosen or implemented, in particular, in such a way that a newly implemented command is directly available at all interfaces.

It is particularly preferable if the control system has a further data interface and is configured to receive control instructions via the further data interface and to control the at least one automation component using said control instructions. Even more of such further data interfaces can obviously also be provided. A further data interface of this type can, in particular, be a conventional interface via which control instructions can be transmitted to the control system. In particular, an internal interface, a PLC or a script-based interface which is then present in addition to the standardized data interface are conceivable here. These interfaces can be designed as functionally identical (possibly except for the real-time capability). A newly implemented command is therefore, in particular, directly available at all interfaces. It is preferably possible to issue commands in parallel from different interfaces. It may be appropriate to provide a data router for different data services in the control system, said data router being used (in particular exclusively) to forward the data which are received via the standardized data interface to an internal command interface via which the control instructions are converted into the control commands in order to control the at least one automation component.

With regard to further preferred designs and advantages of the method, reference is made to the above descriptions of the control system which apply here accordingly.

Further advantages and designs of the disclosure are set out in the description and the attached drawing.

The features specified above and still to be explained below are usable not only in the respectively indicated combination, but also in other combinations, or in isolation without departing the scope of the present disclosure.

BRIEF DESCRIPTION OF THE DRAWINGS

The disclosure is presented schematically in the drawing on the basis of an example embodiment and is described in detail below with reference to the drawing.

FIG. 1 shows schematically an automation system having a control system according to the disclosure in one preferred embodiment.

DETAILED DESCRIPTION

FIG. 1 shows schematically an automation system 100 having a control system 110 according to the disclosure in one preferred embodiment with which a method according to the disclosure can also be carried out. The control system and method will be explained together in detail below with reference to FIG. 1.

As well as the control system 110, the automation system 100 has, by way of example, two automation components 190 and 191 which can be controlled or activated by means of the control system 110. The automation components 190 and 191 may, for example, be handling devices or robots or robot arms. The specific type of the automation system and its automation components is, however, of little relevance to the present disclosure.

The control system 110 now has a standardized data interface 130 which is preferably standardized in accordance with REST. This standardized data interface 130 may, in particular, be a Web server or a part or component thereof. The control system 110 is therefore also configured to receive control instructions 120 in accordance with in accordance with the REST protocol, furthermore particularly in accordance with URI, from outside via the data interface 130.

By way of example, a control instruction 120 is shown which is transmitted from a client 200 disposed outside or remotely from the automation system 100 via e.g. the Internet to the control system 110. The control instruction shown comprises, by way of example, a command 121 for commanding the control system 110 or one of the automation components 190, 191 via said control system, and also information 122 relating to access rights. A more detailed explanation of the control instructions is provided below.

Control instructions incoming via the standardized data interface 130 are fed via a data router 140 to a common interface 150 which converts the control instructions into the control commands for the automation system 100 and feeds them to a buffer memory 160. From there, the individual control commands can then be processed sequentially, i.e. can be output as corresponding signals or commands to control or activate the automation components 190, 191.

The control system 110 further has, by way of example, a further data interface 131, for example a PLC (or a PLC can be provided which has an interface of this type). Control instructions or commands received via this further data interface 131 can similarly—if necessary following a conversion into control commands for the automation system by the common interface 150—be fed to the buffer memory 160 and can then be executed from there. However, it is also conceivable for the buffer memory 160 to be used only for the control instructions incoming via the standardized data interface 130 or the control commands obtained therefrom.

As already mentioned, the control instructions 120 are transmitted from a client 200 to the control system 110. The client 200 may, for example, be a computer having hardware 221, an operating system 220 and a browser 210 (e.g. HTML-based). As already mentioned, however, it does not have to be a browser. Instead of a browser or Web browser, any application can be used which can issue REST requests or corresponding control instructions. Instead of e.g. HTML5, Java/JavaScript or any other technology can be employed which can be executed by the browser that is used.

As already mentioned, a few transactions are defined in REST, wherein POST, in particular, is relevant to the issuing of commands in the present case. REST requests are made via a URI. A URI can be used in the following form for issuing commands or control instructions:

https://<DeviceIP>:<port>/rest/api/<Version>/motion/<ObjectType>/<ObjectName>/cmd/<Command>

Where:
<DeviceIP> is the address of the control system,
<port> is the port number of the request, <Version> is the version number of the standardized data interface,
<ObjectType> is the object to be commanded in the control system (i.e. the automation component concerned, e.g. axis, robot),
<ObjectName> is a unique name of the object to be commanded, and
<Command> is the command (as a string) that is intended to be issued.

A control instruction can therefore, for example, appear as follows:

https://192.168.0.208:8069/rest/api/1.0/motion/axs/X/cmd/posAbs/

With the address "motion/cmd", e.g. global commands for the entire motion system are possible (e.g. switch over global state machine, perform global reset. With the address "motion/axs/<name>/cmd, e.g. individual axis commands for the axis with the name <name> are possible (e.g. switch on power, perform axis reset, perform individual axis movement). With the address "motion/kin/<name>/cmd, e.g. kinematic commands for the kinematic with the name <name> are possible (e.g. perform kinematic reset, move kinematic on a straight line).

A browse on the corresponding address then supplies e.g. a list of all commands of the chosen entity (automation component) in the control system. For example, a browse on "motion/cmd" supplies: ["opstate", "reset"], or a browse on "motion/axs/X/cmd" supplies: ["pos-abs", "pos-rel", "pos-add", "abort", "reset", "power", "add-to-kin", rmv-frm-kin", "jog-abs", "jog-rel"].

Via e.g. a function "query metadata" of a specific address (which applies to an automation component), a JSON schema, for example, can be provided which defines the structure of the parameters of the respective command.

An example of individual axis positioning can appear as follows:

```
{ "axsPos":"1200.0",
  "buffered":true,
  "lim":{"vel":"500.0"
  "acc":"250.0",
  "dec":"250.0"}
}
```

In this example, a movement command is issued and the target position ("1200.0") is contained in the user data. The command is intended to be buffered. Dynamic limits for speed (vel), acceleration (acc and dec) which are intended to or have to be adhered to in the movement are also indicated (in the separate structure "lim") for the command Further optional parameters (e.g. for the dynamic limit "Jerk") would be possible, but are not contained in this commanding.

An example of switching on power can appear as follows:

```
{ "switchOn":true
}
```

In this example, a command is issued which is intended to switch on the power of an individual axis. The only necessary parameter "switchOn" indicates that the power is intended to be switched on (and not switched off).

An example of the incremental jogging of a kinematic can appear as follows:

```
{ "jogDir":["0.0","0.5","0.5"],
  "jogIncrement":"10.0",
  "lim":{"vel":"500.0"
  "acc":"250.0",
  "dec":"200.0"}
  "jrk-acc":"750.0",
  "jrk-dec":"650.0"
}
```

A jog command is issued here for incremental jogging (of a travel movement which travels a defined path length in a predefined direction until it reaches a limit of the configured workspace) of a kinematic. The jogging is intended to act in equal parts on the second and third axis of the kinematic (jogDir is the commanded direction vector), and 10 mm are predefined as the path length (jogIncrement). The dynamic limits are similar to the individual axis positioning indicated above. However, the braking ramp is intended to be flatter, and for this reason a smaller value is predefined for braking acceleration. In addition, jerk limits (jrk) are indicated.

The concept is always compatibly extendable for new entities or automation components (which are then given a separate subaddress) and for new commands (which must have a unique name for the corresponding entity).

Since the possible commands and also the schema of the parameters can be queried from outside, a versioning of the standardized data interface is not necessary. A client can itself determine all relevant data by means of queries to the server (or to the control system). It is even possible to implement a completely generic interface for the commanding which is based exclusively on data of a local control system (and then offers only the commands/parameters which this control/firmware/licensing supports).

The REST request can be transmitted by means of HTTP and is therefore encrypted and integrity is ensured. By means of a rights management implemented in the control system, the operator of the automation system, for example, can control that only authorized persons/groups can issue commands. The authorization concept appropriately operates at individual command level. It can thus be precisely specified which user or which user group is permitted to execute which command.

What is claimed is:

1. A control system for controlling an automation component of an automation system, the control system comprising:
    a standardized data interface configured to receive first control instructions from outside of the control system, the received first control instructions containing user data in a standardized format, the received first control instructions each (i) specifying an action to be performed, (ii) specifying a parameter of the action to be performed, and (iii) identifying the automation component that is to perform the action; and a further data interface configured to receive second control instructions from outside of the control system, the received second control instructions each (i) specifying an action to be performed, (ii) specifying a parameter of the action to be performed, and (iii) identifying the automation component that is to perform the action;

a common interface configured to (i) receive the first control instructions from the further data interface, (ii) receive the second control instructions from the further data interface, and (iii) convert the first control instructions and the second control instructions into control commands for the automation component; and a buffer memory configured to store the control commands, the control commands being stored and removed from the buffer memory according to a sequence of their input, wherein the control system is configured to control the automation component using the control commands, and wherein the control system is configured to output a structural schema of at least one of the control instructions and available control instructions, on request via the standardized data interface.

2. The control system according to claim 1, wherein the standardized data interface is standardized in accordance with Representational State Transfer (REST) and is configured to receive the control instructions in accordance with REST protocol from outside of the control system.

3. The control system according to claim 1, wherein the control system is configured to control depending on information contained in the received control instructions relating to an access right with respect to the control system.

4. The control system according to claim 1, wherein the control system is configured to control the automation component in response to reception of the control instructions via the standardized data interface.

5. The control system according to claim 1, wherein the control system is configured to receive the control instructions via the standardized data interface via a network.

6. A method for operating an automation system having at least one automation component and a control system, the method comprising:

transmitting first control instructions from outside of the control system via a standardized data interface to the control system, the first control instructions containing user data in a standardized format, the control instructions each (i) specifying an action to be performed, (ii) specifying a parameter of the action to be performed, and (iii) identifying the automation component that is to perform the action;

transmitting second control instructions from outside of the control system via a further data interface to the control system, the second control instructions each (i) specifying an action to be performed, (ii) specifying a parameter of the action to be performed, and (iii) identifying the automation component that is to perform the action;

converting, with a common interface, the first control instructions and the second control instructions into control commands for the automation component;

buffering, in a buffer memory, the control commands, the control commands being stored and removed from the buffer memory according to a sequence of their input;

controlling the automation component using the control commands; and outputting a structural schema of at least one of the control instructions and available control instructions, on request via the standardized data interface.

7. The method according to claim 6, the transmitting further comprising:

transmitting the control instructions via a browser which is provided on a computing system disposed remotely from the automation system, via the standardized data interface to the control system.

8. The control system according to claim 2, wherein the standardized data interface is configured to receive the control instructions in accordance with Uniform Resource Identifier (URI) protocol.

9. The control system according to claim 1, wherein the user data is contained in the control instructions in JavaScript Object Notation (JSON) format.

10. The control system according to claim 5, wherein the control system is configured to receive the control instructions via the standardized data interface via an Internet.

* * * * *